3,106,525
METHOD OF TREATING WATERS TO BE INTRODUCED INTO GEOLOGICAL FORMATIONS
Christoph Schmid and Rudolf Gedenk, Wietze, Kreis Celle, Germany, assignors to Deutsche Erdöl-Aktiengesellschaft, Hamburg, Germany, a corporation of Germany
No Drawing. Filed June 4, 1957, Ser. No. 663,346
Claims priority, application Germany June 5, 1956
1 Claim. (Cl. 210—57)

This invention relates to a method of treating waters which are to be introduced into geological formations. Thus, in the petroleum industry, it is frequently necessary to introduce water into the oil-bearing geological formations, as an incident to the recovery of oil therefrom.

The yield of oil bearing formations can frequently be considerably improved by flooding such formations with water. In this connection, surface water, water derived from other geological formations, or water separated from oil extracted from a particular formation, is introduced into such formation, using pressure pumping if necessary. This type of water flooding procedure serves to displace the oil content directly from the formation, or may be used to maintain pressure in the formation.

In other cases, it is necessary to introduce or force pump industrial waste waters, such as those incident to the extraction and refining of petroleum, into suitable geological formations, when such waste waters cannot otherwise be suitably utilized, as for drinking water or the like.

In the foregoing cases, as well as other situations in which water of various origins is to be introduced into permeable geological formations for one reason or another, the specific properties of both the rock formations and any liquids present therein, must be taken into consideration.

The porous, permeable rock, which may consist by way of example, of sandstone with variable quantities of clay and calcareous minerals associated therewith, is in continuous contact with and therefore in chemical equilibrium with the original water content of the rock formation. Such water content may have dissolved therein considerable quantities of various salts.

Upon introducing water from external sources into such rock formations, it is necessary that the original chemical equilibrium be left undisturbed, lest reactions take place between the water from the external source on the one hand, and the rock and associated water on the other hand, where such reactions may lead to any reduction in the permeability of the rock formation. Thus, there may occur a swelling action or a precipitation of materials, either of which may impede or altogether stop the further introduction of water into the rock formation.

The waters associated with rock formations frequently contain carbon dioxide and bicarbonates of bivalent cations, primarily calcium, magnesium and iron. Accordingly, the presence of oxygen in the water being introduced into the formation, must be particularly eleminated and avoided, since such oxygen would immediately lead to the formation of voluminous masses of ferric hydroxide, thereby clogging the passages or channels in the rock formation.

Many of the waters which are to be introduced into the rock formations, contain as original constituents, bivalent water soluble iron compounds which are converted on contact with atmopsheric oxygen into ferric hydroxide. The ferric hydroxide which is thus precipitated in flocculent form, may be filtered off before the water is introduced into the rock formations. However, such ordinary filtration procedures will not remove that portion of the ferric hydroxide present in colloidal form and which is capable of clogging passages in the formation on the passage of time.

In other instances, water is removed from a given geological formation for introduction into another geological formation where it is used for flooding purposes or to maintain pressures. These waters frequently contain dissolved iron salts which in the presence of oxygen are converted into insoluble, precipitated compounds.

In view of the conditions which may arise as an incident to the introduction of waters into geological formations, it is necessary to treat such waters to avoid objectionable occurrences and impeded operations.

It is known in the art to remove soluble iron salts from solution by chemical means, as for example by oxidation of the ferrous salts in the presence of bases to form insoluble ferric hydroxide, which is then filtered out. Reducing agents such as hydrazine have also been added to iron salt containing waters to inactivate any oxygen content of the water. In this way it is possible to prevent the precipitation of the iron salts previous to contact with oxygen, but such procedure is of no avail in respect to already precipitated iron salts. Such procedures usually operate in several stages; require complicated preparatory procedures and the necessary equipment requires careful, expert supervision. It follows that such procedures are of high cost.

In accordance with the present invention, it is proposed to add to waters prior to their introduction into geological formations, reducing agents which have the property of deactivating oxygen dissolved in the waters; maintaining the dissolved iron salts in solution; and dissolving any iron salts which have precipitated from solution. In this way any reactions which might lead to precipitation and consequent clogging action, are controlled. Furthermore, any precipitated iron compounds already present in the channels of the rock formation, will be redissolved, thus facilitating the introduction of the waters into the formation.

As agents useful for the purpose indicated, consideration is particularly directed to sulfur-containing reducing agents such as dithionites, sulfinic acid, sulfinates or other compounds which contain the sulfinic-acid or sulfoxylate group, singly or as multiples thereof. Such compounds may be added to the waters individually or as mixtures.

Such reducing agents have the dual property of inactivating oxygen dissolved in the water to be treated and of converting any insoluble ferric hydroxide present in colloidal or coarsely dispersed form, into water soluble form. If a particular water initially contains neither free oxygen or ferric hydroxide, the addition of the said reducing agents to the water will be effective to deactivate any subsequent content of free oxygen thereby preventing the conversion of bivalent iron compounds into ferric hydroxide.

If ferric hydroxide precipitate has already been introduced into a geological formation or formed in situ by oxygen entrained in the water, it is possible, through the use of said sulfur containing reducing agents in association with waters to be introduced into said formations, to reduce the ferric hydroxide precipitates and to dissolve the same out of the passages or channels of the formation.

When introducing waters from external sources into geological formations, it is important that reactions between the rock formation and the introduced water, are avoided. In many cases, the water already present in the formation contains carbon dioxide and may have a pH of from about 5 to about 6. The water being introduced should preferably have the same pH, which may be readily attained by adding carbon dioxide to the water until the desired pH value is reached. Such addition of carbon dioxide is particularly advisable when sulfinic acid salts are used as reducing agents since the desired pH value may be more easily produced.

The action of the sulfur-containing reducing agents used in accordance with the instant invention, is illustrated in the following examples:

I

A sample of natural deposit water is provided, such water having been treated with air and filtered and contains about 180 grams of salts per liter and more particularly 8–10 mg. of coloidally distrbuted ferric hydroxide as well as 10 mg. of oxygen, per liter. Carbon dioxide is added to the sample to bring the pH thereof to between 5 and 6. 100 cc. of the sample is treated with 10 mg. of sodium oxymethane sulfinate. Upon heating, the colloidal ferric hydroxide starts to appear in the form of a brown cloud at about 50° C. Upon continued heating, the reducing reaction takes palce at about 60° C. and the solution becomes clear and colorless.

II

A sample of deposit water is treated with air but is not filtered. The composition of the sample is similar to that of Example I. In addition, the sample contains larger quantities of flocculated ferric hydroxide. On uniform distribution of the precipitate in the sample, a 100 cc. sample is brought to a pH of 5 to 6 by the addition of carbon dioxide, and is then treated with 50 mg. of sodium oxymethane sulfinate. On heating, both the flocculent and the colloidally distributed ferric hydroxide is brought into solution and the liquid becomes clear and colorless.

III

A sample of natural deposit water containing about 180 grams of salts per liter, is provided. Such sample shows minimal amounts of dissolved oxygen. There are dissolved in the sample about 200 mg. of iron salts of bivalent form. Two specimens of the thus treated water, each being about 100 cc., are taken. One of the specimens ($a$) is allowed to stand in contact with the atmosphere; the other specimen ($b$) is treated with 1 mg. of sodium oxymethane sulfinate and also allowed to stand in contact with the atmosphere. In the case of specimen ($a$), after a few hours, a formation of flocculated ferric hydroxide is noted; whereas in the case of specimen ($b$) no cloud or precipiate is noted after 30 hours.

In practice, it was found that the pressures with which water was to be introduced into a particular geological formation was initially of the order of 37 atmospheres, but within 14 days such required pressures had dropped to about 25 atmospheres.

The examples above, show that the specific reducing agent employed is able to deactivate oxygen and at the same time to convert colloidally or coarsely dispersed forms of ferric hydroxide into soluble compounds. Furthermore, such agents prevent access of oxygen to existing quantities of oxidizable bivalent iron compounds from which insoluble ferric hydroxide could be formed.

In many cases, the waters which are to be introduced into geological formations through iron pipe lines, are of a corrosive nature and tend to destroy the pipe lines and associated fittings and accessories. Accordingly, corrosion-preventing agents adapted to protect iron pipes are added to the waters and such known anti-corrosion agents may be added to the waters containing reducing agents of this invention.

In addition, various materials are added to waters to inhibit the growth of algae and bacteria therein, which also may adversely affect the permeability of the rock formations. By the use of sodium oxymethane sulfinate as a reducing agent, there is also provided an effective source of bactericidal agents, thus eliminating the need for separate bactericides.

What is claimed is:

A method of treating waters which are to be introduced into a geological formation and which contain dissolved oxygen and soluble ion salts, comprising adding to such waters a reducing agent of the formula R—$SO_2H$ in which R is selected from the class of alkyl, aryl, aralkyl and hydrogen radicals, and formaldehyde addition products thereof, for inactivating said dissolved oxygen and for retaining said soluble salts in solution and for dissolving any precipitated iron compounds, and adding carbon dioxide to said waters to bring the pH thereof to from about 5 to 6.

References Cited in the file of this patent

UNITED STATES PATENTS

| | | |
|---|---|---|
| 1,117,831 | Gans | Nov. 17, 1914 |
| 1,958,483 | Loughlin | May 15, 1934 |
| 2,315,514 | Fox | Apr. 6, 1943 |
| 2,350,111 | Hood | May 30, 1944 |
| 2,632,698 | Stewart | Mar. 24, 1953 |